United States Patent [19]

Yang

[11] Patent Number: 5,796,258
[45] Date of Patent: Aug. 18, 1998

[54] ADAPTIVE QUADRILATERAL CHARACTERISTIC DISTANCE RELAY

[75] Inventor: Lifeng Yang, Coral Springs, Fla.

[73] Assignee: ABB Power T&D Company, Inc., Raleigh, N.C.

[21] Appl. No.: 790,553

[22] Filed: Jan. 30, 1997

[51] Int. Cl.$^6$ .............................. H02H 3/38; G01R 31/02
[52] U.S. Cl. .................. 324/522; 324/525; 324/521; 324/86; 361/80
[58] Field of Search ................ 361/80; 364/492; 324/522, 525, 521, 509

[56] References Cited

U.S. PATENT DOCUMENTS

| | | | |
|---|---|---|---|
| 4,222,085 | 9/1980 | Mesmaeker | 361/80 |
| 4,230,982 | 10/1980 | Mesmaeker | 324/521 |
| 4,249,124 | 2/1981 | DeMesmaeker | . |
| 4,268,886 | 5/1981 | Mesmaeker | 361/80 |
| 4,287,547 | 9/1981 | Vitins | 324/522 |

OTHER PUBLICATIONS

Zhang Zhizhe et al., "An Adaptive Approach in Digital Distance Protection," Jan. 1991 IEEE.

Elmore, Walter, "Evolution of Distance Relaying Principles," 48th Annual Conference for Protective Relay Engineers, Texas A&M University, College Station, Texas, Apr. 3–5, 1995.

Primary Examiner—Ernest F. Karlsen
Assistant Examiner—Jose M. Solis
Attorney, Agent, or Firm—Woodcock Washburn Kurtz Mackiewicz & Norris LLP

[57] ABSTRACT

A quadrilateral characteristic relay system for determining a fault associated with a multiple-phase electric power transmission system is disclosed. The system dynamically adapts one line of the quadrilateral trip region to account for the interaction of load current and fault resistance. As a result of the adaptation, the system exhibits better overreach and underreach performance characteristics. The system employs impedance and voltage plane quadrilateral characteristics using negative sequence current as a proxy for fault current. In the voltage plane, the fault determination is made through a series of comparisons, avoiding computationally inefficient mathematical divisions.

22 Claims, 5 Drawing Sheets

ADAPTIVE QUADRILATERAL CHARACTERISTIC DISTANCE RELAY

FIELD OF THE INVENTION

The present invention relates generally to the field of protective relaying. More particularly, the invention relates to a system for automatically locating faults on an electrical transmission line by processing voltage and current phasors measured at a single end of the line.

BACKGROUND OF THE INVENTION

Distance relays with quadrilateral characteristics have been in use for several decades. Such relays are characterized by a fixed fault trip region delimited by four lines, typically representative of resistance and reactance settings. Unlike relays with a circular trip region, such as Mho type relays, the quadrilateral characteristic relays are desirable for their ability to detect high resistance faults.

The typical operational characteristics of the quadrilateral relay are best illustrated by reference to an electrical line representation in conjunction with an impedance plane diagram. FIG. 1 schematically depicts a phase "a" to ground fault, with a fault through an impedance $R_f$ on a homogeneous line (impedance $Z_1$) between buses A and B. The elements of the model are defined as follows:

$V_a$ represents the local bus voltage;

$I_a$ represents the current through the transmission line before the fault point;

$R_f$ represents the fault resistance (assumed to be real);

$I_f$ represents the current through the fault resistance;

$V_f$ represents the voltage across the fault resistance;

$Z_1$ represents the impedance of the total transmission line; and, $I_{a-f}$ represents the current flowing to the load after the fault point.

Although phase "a" was selected for simplicity and clarity, the model applies equally to other phases.

An equation representative of the measured impedance of the faulted circuit shown in FIG. 1 is as follows:

$$Z_a = mZ_1 + \frac{I_f}{I_a + KI_0} R_f$$

where:

m is the unit distance to the fault;

$Z_1$ is the line impedance;

$I_f$ is the fault current;

K is a cross-coupling factor that accounts for the effects of the other phases in a three-phase system;

$I_0$ is the negative sequence current of the circuit; and, $R_f$ is the fault resistance, which is assumed to be real. The values $I_a$ and $KI_0$ are together referred to as the relay current, $I_{relaya}$. That is $I_{relaya}$ is equivalent to $I_a+KI_0$ where the subscript "a" denotes the phase (e.g., "a", "b" or "c").

Faults such as the one depicted in FIG. 1 have been detected by relays with a quadrilateral trip region. FIG. 2 depicts an impedance plane graph of a relay having a conventional quadrilateral trip region. The top line, D-B, in the graph is referred to as the reach setting of the relay and is of particular interest to the present invention. Conventionally, the reach is set to 80 percent of the line impedance $Z_1$. Thus, a horizontal line D-B is graphed that intersects the $Z_1$ phasor at the 80 percent point (i.e., $Z_{set}$).

The other lines on the quadrilateral are set to achieve desired trip characteristics. For example, $Z_d$ is set to compensate for errors in the computation of the line impedance model and for that reason has a small angle to the left of the X axis. $Z_c$ is set to the value of the fault resistance that will trip the relay. A small negative angle is added to $Z_c$ to detect close in faults. $Z_{cb}$ is generally set to the same angle as $Z_{ser}$.

During operation of the relay, if the measured impedance $Z_a$ falls within the trip region defined by the four sides of the quadrilateral of FIG. 2, a fault has occurred and will be treated accordingly (for example, by signaling a circuit breaker to open). On the other hand, if the measured impedance $Z_a$ is outside of the quadrilateral trip region, then the quadrilateral characteristic relay will not detect a fault. However, under some circumstances, particularly in the case of a high impedance fault, the load may continue to affect the circuit and result in the quadrilateral characteristic relay underreaching or overreaching. That is, a fault occurring within the 80 percent reach setting of the line impedance may not cause a trip, or a fault occurring outside of the 80 percent reach setting may cause a trip. An effective technique to account for underreach or overreach is to dynamically adapt the reach line (i.e. the line D-B) for changing circuit conditions, such as load current and fault resistance.

Early quadrilateral characteristic relays provided only fixed trip regions. For example, an early solid-state device for performing the quadrilateral trip region detection of faults is disclosed in De Mesmaeker, U.S. Pat. No. 4,249,124. De Mesmaeker purports to use voltage signals representative of impedance values to define a quadrilateral trip region defined by four lines. However, De Mesmaeker discloses a solid state approach that does not incorporate the flexibility and other advantages of modern microprocessor design. Importantly, the fixed trip region disclosed in De Mesmaeker does not account for the interaction of load current and fault impedance. As a result, the De Mesmaeker approach suffers from underreach and overreach errors.

Some more recent microprocessor based relays purport to account for overreach by providing a fixed tilt to the line D-B of the quadrilateral trip region. However, such relays do not dynamically adapt their trip region based on the effects of load current and fault resistance. As a result, they do not effectively compensate for overreach or underreach because the measured impedance has an error due to fault resistance. And, that error changes depending on the interaction of fault resistance, load current and the K factor. In some instances, the error can be significant.

Adaptive distance relaying schemes have been proposed that purport to eliminate the measured impedance error. Such approaches require a reliable and high speed communication channel between buses, resulting in higher costs. However, an adaptive approach to the quadrilateral characteristic that uses data from one end of the line was described in Z. Zheng and D. Chen, *An Adaptive Approach in Distance Protection*, IEEE Transactions on Power Delivery, Vol. 6, No. 1, January 1991, pp. 135–142. In the approach described by Zheng and Chen, zero sequence current is substituted for the fault current, and the angle of the top line (i.e., D-B in FIG. 1) is dynamically tilted around the end of the phasor Zset in proportion to the change in the phase angle between the zero sequence current and the current as viewed from the relay. The accuracy of the approach depends on the assumption that the zero sequence distribution factor is real. Unfortunately, it is well known that the zero sequence distribution factor depends on many factors such as grounding systems, earth resistance and fault location as well as transmission networks. Consequently, the phase angle of the zero sequence factor is not stable and can be large in some cases.

Thus there is a need for an adaptive quadrilateral characteristic relay that dynamically adjusts the trip region based on the interaction of fault resistance, load current and cross coupling effects, wherein the required information can be obtained from one end of an electrical transmission line while providing increased accuracy and stability.

SUMMARY OF THE INVENTION

The present invention provides a system (process and apparatus) for monitoring at least one electric power transmission line for a fault condition within a predetermined distance from a measuring location. The system comprises measuring means coupled to an electric power transmission line at a measuring location for measuring line voltage phasors and line current phasors and processing means for defining a quadrilateral trip region in a reference plane. The quadrilateral trip region is formed from four reference phasors. The phase of one of the four reference phasors is periodically adapted based on a negative sequence current. The processing means are coupled to the measuring means for deriving a phasor indicative of the fault (herein referred to as a "line signal") having a phase from at least one of the line voltage phasor and the line current phasor. The line signal is compared to the phase of each of the four reference phasors such that the fault condition is detected. The reference plane can be either a voltage plane or an impedance plane. In the voltage plane, the fault can be detected without performing mathematical division operations.

The system employs negative sequence current as a proxy for fault current. To that end, the phase difference, α, between the fault current and the relay current is determined according to the equation:

$$\alpha = arg(I_{relaya}) - arg(I_{a2})$$

where:

a denotes the faulted phase;

$I_{a2}$ comprises the negative sequence current of the faulted phase;

$I_{relaya}$ is the relay current in the faulted phase.

Furthermore, the system can be implemented in a set of electric power transmission lines that comprise a multiple phase electric power transmission system. In such a case, a phase-to-phase fault condition can also be detected by the system. In a multiple phase fault, the phase of the line signal is derived as a difference in phase between each of the faulted phases, and the adapted reference phasor is adapted as a function of a difference between at least one of the line current phasors and the line voltage phasors of each of the faulted phases.

In the multiple phase fault case, the phase difference, α, between the fault current and the relay current is determined according to the equation:

$$\alpha = arg(I_{ab} - I_{1dab}) - arg(I_{ab})$$

where:

ab indicates the faulted phases;

$I_{ab}$ comprises the difference between the first faulted-phase current and the second faulted-phase current phase; and, $I_{1dab}$ comprises the difference between the first phase load current and the second phase load current.

DETAILED DESCRIPTION OF PREFERRED EMBODIMENTS

The present invention provides a system (methods and apparatus) for monitoring electrical transmission lines for fault conditions. In preferred embodiments of the invention, voltage and current phasors from one terminal of a protected line are required. Although the invention is described throughout the description in reference to a protective relay, it is not necessary that these phasors be provided by a protective relay per se, as they could be computed in a separate processor. For example, the invention may be incorporated into a separate fault determining device.

I. System Description

Figure 3:
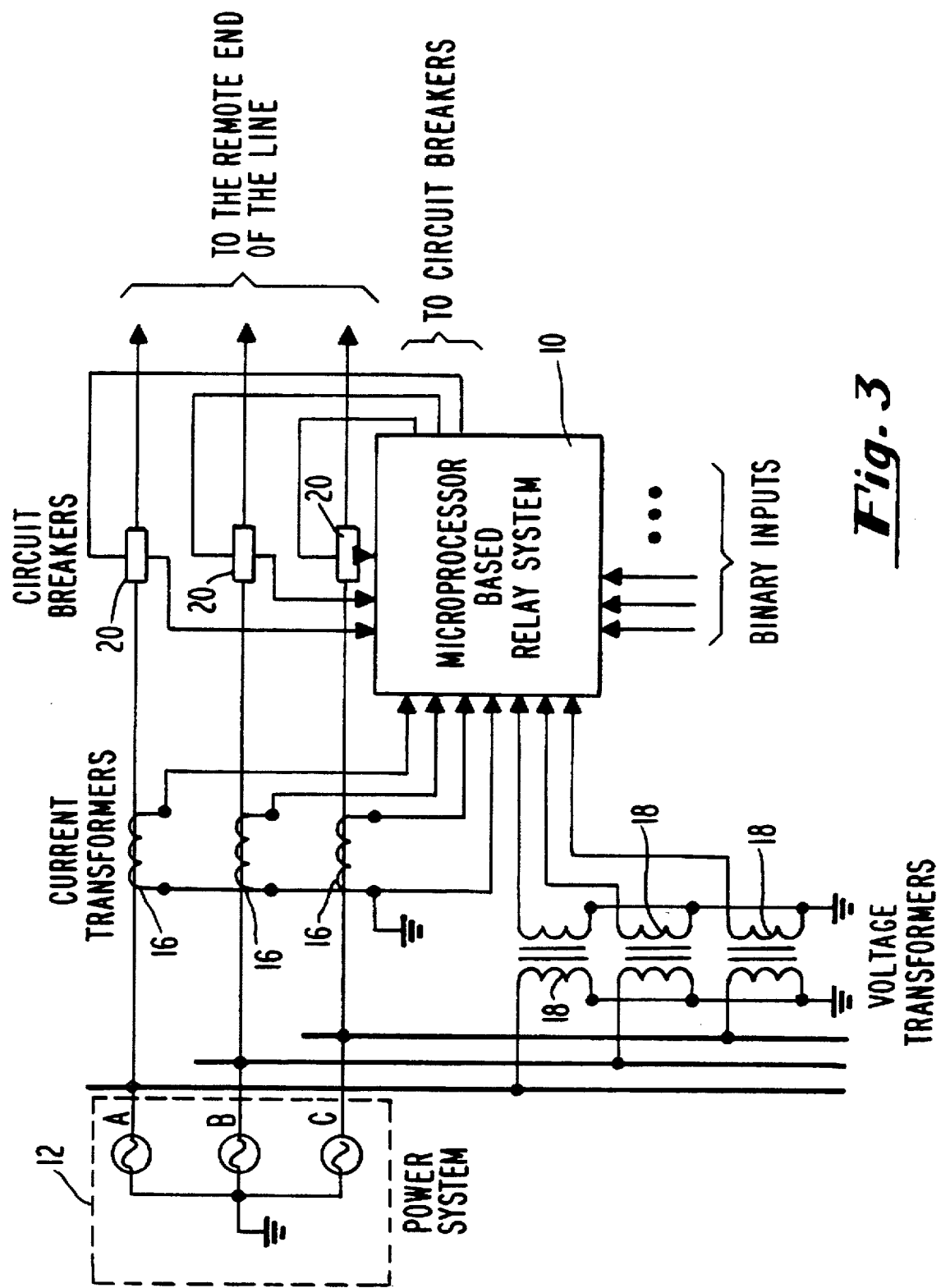
FIG. 3 is a schematic diagram of a fault detection system in accordance with the present invention.

FIG. 3 schematically depicts an exemplary microprocessor based protective relay in a three-phase power system wherein the present invention may be employed. Power source 12 provides voltage and current to the three-phases ("a","b" and "c") of the system. Current transformers 16 provide a mechanism to supply a measure of the current flowing through each respective phase of the power system to microprocessor based relay 10. Similarly, voltage transformers 18 provide a mechanism to supply a measure of the voltage on each respective phase of the power system to microprocessor based relay 10. Additionally, binary inputs may be supplied to the microprocessor based relay. Inside the relay, a trip decision is made based on information obtained from the inputs. If a decision is made to trip, a signal is provided from relay 10 to the appropriate circuit breaker or circuit breakers 20, causing the circuit to open.

Phase currents and voltages are continuously monitored for fault conditions. As will be described in further detail below, two adaptive approaches to detecting faults by a relay with a quadrilateral characteristic are disclosed: (1) a first approach using an impedance plane method; and (2) a second approach using a voltage plane method.

II. Impedance Plane Method

Figure 4:
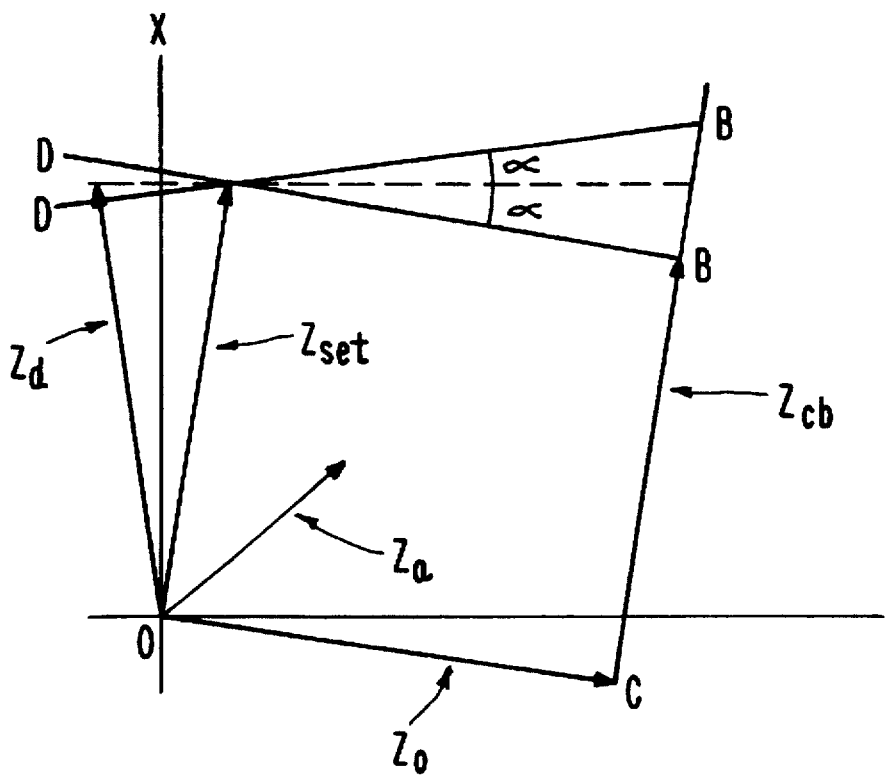
FIG. 4 is a graph of an impedance plane quadrilateral trip region in accordance with an embodiment of the present invention.

FIG. 4 presents a quadrilateral trip region defined in the impedance plane. The quadrilateral trip region is dynamically adjusted in accordance with the present invention. In particular, three of the four vectors forming the quadrilateral are fixed (i.e., O-D, O-C, and C-B). The remaining vector (i.e., D-B) is dynamically adapted by the angle α, which is the difference in phase angle between the negative sequence current phase and the relay current phase. The reach end of vector Zset is used as a pivot for the tilt of the vector D-B.

A key step in the adaptation is to calculate the angle α. Significantly, α provides an adjustment of the vector D-B based on fault current. Since the fault current cannot be directly measured with one end data, some substitution must be made. There are a number of possible substitutions for fault current. In case of a single phase to ground fault, the substitutions may be: (1) the positive plus negative sequence current, (2) positive sequence current only, (3) zero sequence current, and (4) negative sequence current. These substitutions are described in co-pending patent application Ser. No. 08/791,816, attorney docket no. ABRE0510/B940320, entitled "ONE-TERMINAL FAULT LOCATION SYSTEM THAT CORRECTS FOR FAULT RESISTANCE EFFECTS" filed on the same date as the present application, which is hereby incorporated by reference.

One key criterion for selecting a fault current substitution is to have a minimum phase angle error introduced in the substitution. The first and second options employ the load current. Unfortunately, in an evolving fault, the load current, which is calculated using pre-fault data, may not be valid. The third option, which uses zero sequence current, is not stable and may introduce a large phase error. Thus, a phase angle error may result. The fourth option, which uses the negative sequence current, has the advantages of not requiring profiled information and having a nearly real phase. Accordingly, the fourth option is the best.

Figure 5:
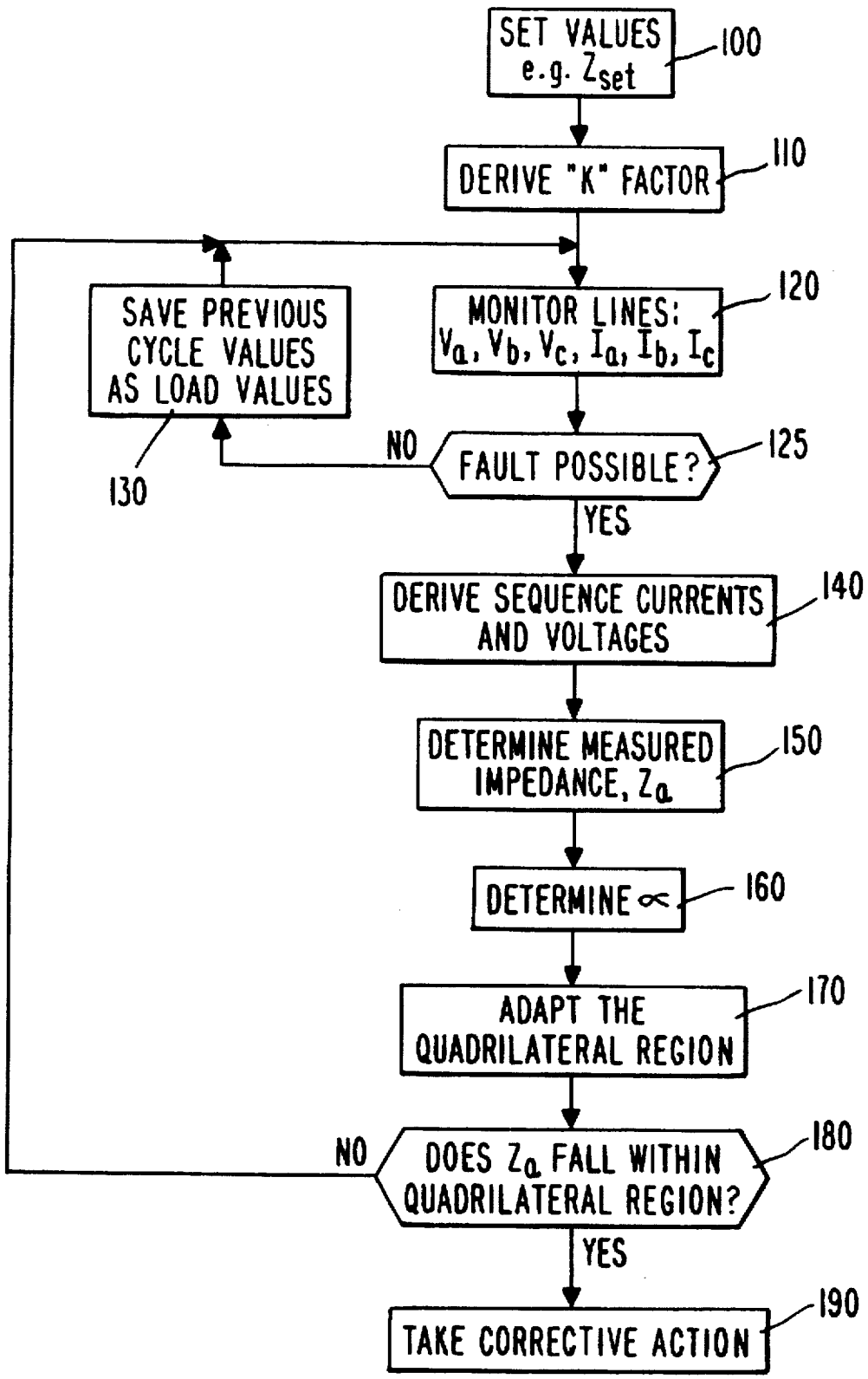
FIG. 5 is a flowchart of an impedance plane fault detection process in accordance with an embodiment of the present invention.

The present invention will now be described with reference to the flowchart of FIG. 5 in conjunction with the quadrilateral trip region shown in the impedance plane chart of FIG. 4. Before the process of fault monitoring begins, several constant values are needed by the process and must be provided. For example, values for the fixed vectors of the quadrilateral trip region (e.g., $Z_c$, $Z_d$ and $Z_{set}$), line positive sequence impedance, $Z_{11}$, and zero sequence impedance, $Z_{10}$, must be set into the microprocessor based relay 10 (step 100). These constant values are used to derive a cross coupling factor, "K" (step 110). In a three-phase system, the cross-coupling from other lines induces current in the other phases. Therefore, the current in any one phase must be compensated for the current induced in that phase by the other phases. The "K factor" is used to compensate for the cross coupling. The K factor is defined as:

$$K = \frac{Z_{10} - Z_{11}}{Z_{11}} \quad (1)$$

This K factor is then maintained as a constant in relay 10.

After the initialization, the relay continuously monitors the lines for faults by measuring the voltages and currents of all three phases (i.e., $V_a$, $V_b$, $V_c$, $I_a$, $I_b$, $I_c$) (step 120). Each voltage and current phasor is determined from a set of sampled values, for example, eight samples per cycle. The sampled values are then checked for the possibility that a fault has occurred (step 125). This determination is done according to well-know techniques such as by comparing the measured samples to the previous samples wherein a large difference in measured values is indicative of a likely fault. If no fault is likely, the samples are saved as the load values and the monitoring continues (step 130). As a result, when a fault determination is being performed, there are two sets of sampled voltages and currents available, the set from the previous iteration (load values) and the set from the current iteration. If a fault is possible, the quadrilateral trip determination is made.

For a single-phase-to-ground fault, the faulted phase voltages and currents are used to derive the sequence currents and voltages according to well-known sequence network techniques. The details of the conversion to sequence values is left out of the present description for clarity and brevity. Using a phase "a" fault as an example, $I_a$ is converted to $I_{a1}$, $I_{a2}$ and $I_{a0}$ and $V_a$ is converted to $V_{a1}$, $V_{a2}$ and $V_{a0}$ (step 140). Those skilled in the art will appreciate that the same sequence of steps can be performed for each of the other phases.

The next step is to determine the measured impedance, $Z_a$, in the faulted phase. From the relay phase current, and measured voltage, $V_a$, the impedance, $Z_a$, is determined according to equation (2) as described below (step 150):

$$Z_c = \frac{V_c}{I_{relaya}} \quad (2)$$

where all the values are the same as those described above.

Finally, the difference in phase, α, between the relay current and the negative sequence current is determined (step 160):

$$\alpha = arg(I_{relaya}) - arg(I_{a2}) \quad (3)$$

The top line (i.e., vector D-B) of the quadrilateral trip region can then be adapted by the value a (step 170). In particular, the vector D-B is rotated by the angle α with an axis of rotation about the end of vector $Z_{set}$. Thereafter, if the impedance value $Z_a$ falls within the dynamically defined quadrilateral region, a fault is detected and appropriate steps are taken (steps 180–190). For example, a signal is provided to the circuit breaker to open the circuit. If no fault is detected, the system continues monitoring the three phases.

III. Voltage Plane Method

The quadrilateral trip region can also be implemented in a voltage plane. Such a method offers the advantage of providing a quadrilateral trip region, while avoiding the mathematical divisions needed by the impedance plane implementation. By contrast, the fault impedance and the angle α must be explicitly calculated in the impedance plane method. As a result of those angle calculations, some mathematical divisions must be performed. Consequently, the impedance plane method may not be favorable to a microprocessor based device because the mathematical divisions require much more complicated operations than either additions or multiplications.

Figure 1:
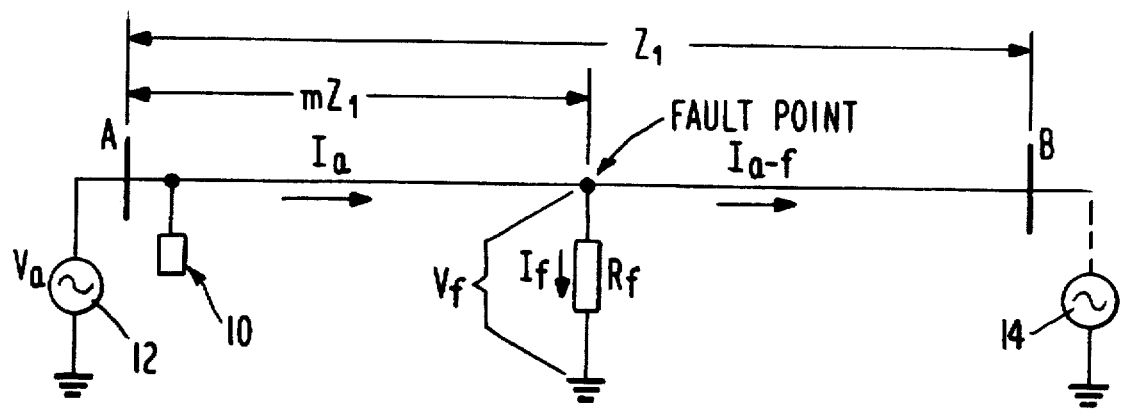
FIG. 1 is a schematic diagram of a phase "a" to ground fault in an electrical power distribution system.
Figure 6:
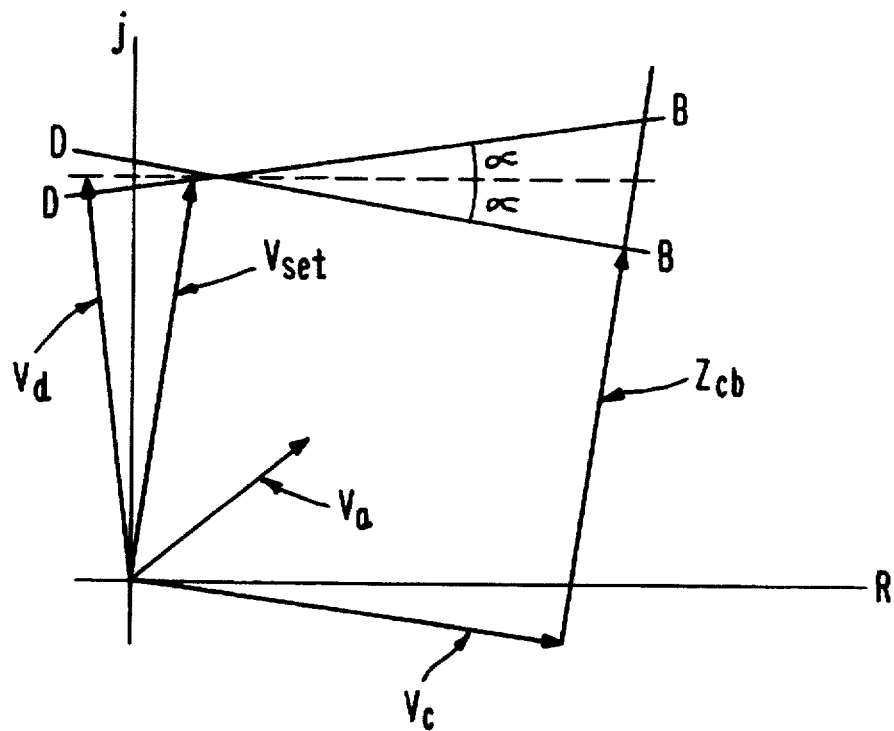
FIG. 6 is a graph of a voltage plane quadrilateral trip region in accordance with an other embodiment of the present invention; and, FIG. 7 is a flowchart of a voltage plane fault detection process in accordance with an other embodiment of the present invention.
Figure 2:
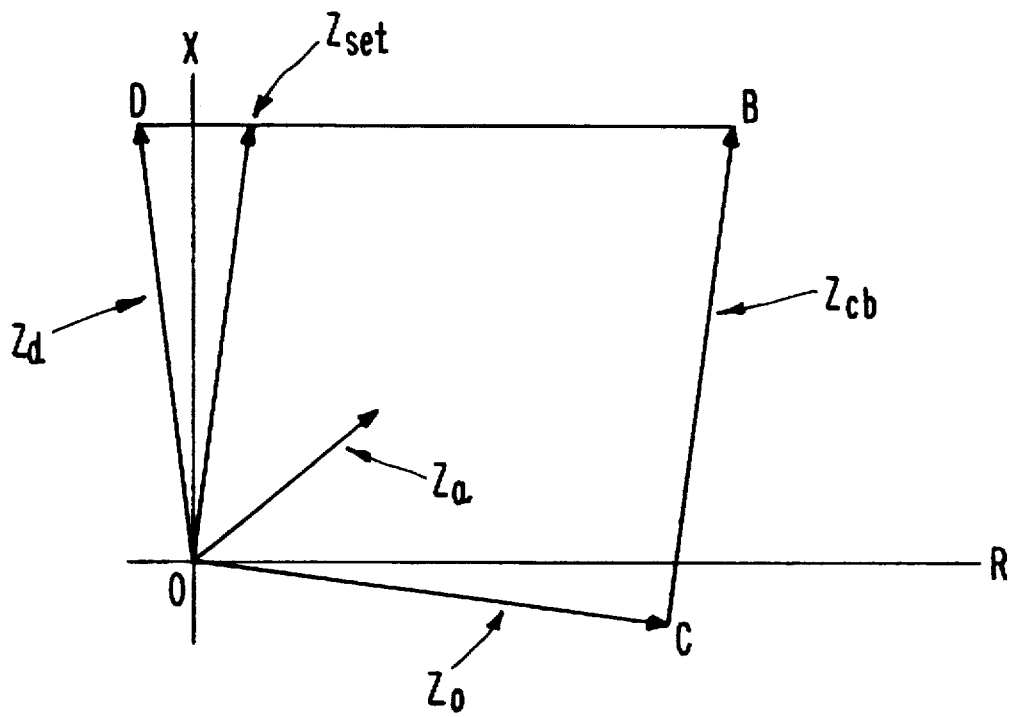
FIG. 2 is a graph of a fault trip region of a typical prior art quadrilateral characteristic relay.

FIG. 6 provides a graphical depiction of the quadrilateral characteristic trip region as it appears in the voltage plane. As with the impedance plane, three of the vectors defining the quadrilateral remain fixed, while the top vector (i.e., D-B) is adapted based on the angle of α. However, as is explained more fully below, the value for α does not need to be explicitly determined. Instead, four phase comparators can be used to realize the exact same characteristic as was obtained by using the impedance plane method without explicitly computing the fault impedance or the tilt angle.

Figure 7:
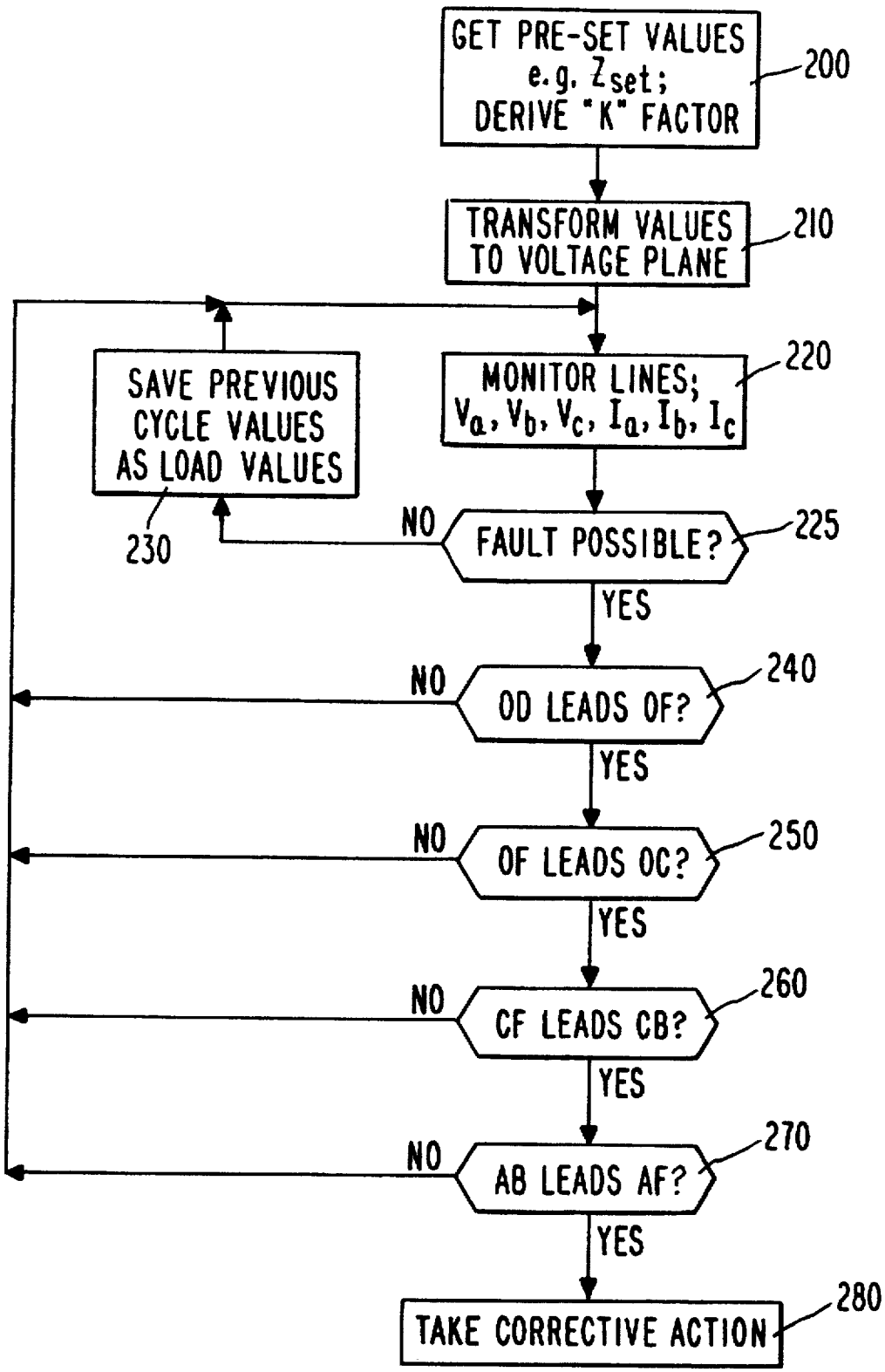

The method of determining a fault in accordance with the voltage plane method is best described with reference to the flow chart of FIG. 7. Step 200, like the impedance plane method steps 100–110 is an initialization step. After the initialization, the quadrilateral characteristics in the impedance plane (see FIG. 4) are transformed to a voltage plane (see FIG. 6) by multiplying each impedance plane vector by the relay current ($I_a+KI_0$). The line voltages and currents are then monitored for a likely fault just as in the impedance plane method (steps 220–230). After the likelihood of a fault has been detected (step 225), the voltage plane quadrilateral fault determination begins. The four pairs of compared quantities both in the impedance and voltage planes are listed in Table 1 below. The table compares the four pairs of comparisons in the voltage plane that are equivalent to those in the impedance plane.

Note that in the table, $Z_{cb}$ and $Zd$ have the same phase angle as their corresponding phasors CB and OD respectively. Their magnitudes can be any nonzero value because the magnitude of a phasor in a phase comparison is not important. Also as indicated in Table 1 the voltage plane requires no divisions or angle calculations. As a result, the voltage plane method can be implemented in either the frequency or time domain; whereas, the impedance plane method is difficult to implement in the time domain because of the impedance and angle calculations.

TABLE 1

Phase Comparator Based Quadrilateral Characteristic

| Compared Plane Vector | Impedance Plane Equivalent | Voltage Plane Equivalent |
|---|---|---|
| OD & OF | $Z_d$ & $Z_a$ | $(I_{relays}) Z_d$ & $V_a$ |
| OF & OC | $Z_a$ & $Z_c$ | $V_a$ & $(I_{relays}) Z_c$ |
| CF & CB | $Z_a - Z_c$ & $Z_{cb}$ | $V_a - (I_{relays}) Z_c$ & $(I_{relays}) Z_{cb}$ |
| AB & AF | $\frac{I_{a2}}{I_{relays}}$ & $Z_a - Z_{set}$ | $I_{a2}$ & $V_a - (I_{relays}) Z_{set}$ |

The operation logic for the voltage plane method is straight forward. If the first phasors in all the compared groups lead the second phasors (i.e., OD leads OF, OF leads OC, CF leads CB and AB leads AF), then an internal fault will be assumed (steps 240–270) and corrective action will be taken (step 280). Otherwise, there is no fault condition and the measured values are saved as the load values (step 230).

In the voltage plane method, directionality may be lost in a close-in zero voltage fault. In such a case, appropriate action must be taken to prevent the relay from misoperating. Following conventional practice, when the phase voltage is lower than a pre-specified level, the healthy-phase voltages replace the faulty-phase voltage. For example, for a phase "a"-to-ground fault, the voltage between phases "b" and "c" shifted by 90°, $j\Delta V_{bc}$, will replace $V_a$. Such an approach is similar to a quadrature polarized distance relay where $\Delta$ can be a very small value as long as the phase relationship can be established. Importantly, the zero voltage action is only taken on the measured voltage in the first two compared groups listed in Table 1.

Usually, the fault resistance across phases is much smaller than the ground fault resistance, and a phase-to-phase fault has less overreach or underreach compared to a single-phase-to-ground fault. Because the reach errors are smaller, the quadrilateral characteristic relay, which is tolerant of some reach errors, is usually only considered for a ground distance relay. However, while the reach error due to fault resistance may be relatively small, it does exist. Accordingly, this small reach error can be minimized by applying similar quadrilateral characteristic principles as were applied for the single-phase-to-ground fault.

Consider a phase "b"-to-phase "c" (bc) fault. The voltage equation can be written as:

$$V_{bc} = I_{bc} m Z_1 + \frac{\Delta I_{bc} R_p}{2 K_1} \tag{4}$$

where:

$V_{bc}$ is equal to $V_b - V_c$;
$I_{bc}$ is equal to $I_b - I_c$;
$\Delta I_{bc}$ is equal to $I_{bc} - I_{1dbc}$;
$R_p$ is fault resistance between phases;
$K_1$ is the positive sequence distribution factor; and, $I_{1dbc}$ is pre-fault load current.
In the impedance plane, $\alpha$ for a bc fault is defined as:

$$\alpha = arg(\Delta I_{bc}) - arg(I_{bc}) \tag{5}$$

Accordingly, following the same procedures as was used for the single-phase-to-ground algorithm, the phase-to-phase adaptive quadrilateral distance relay algorithm in the impedance plane can be constructed.

In the voltage plane, if $\Delta I_{bc}$ is taken as a polarizing quantity, then the fault resistance effect can be eliminated. A phase comparison that characterizes the top line (A-B) of the quadrilateral characteristic can be made between $\Delta I_{bc}$ and $(V_{bc} - I_{ab} Z_{set})$. The other three phase comparisons in the quadrilateral characteristic can be made in a similar manner to the single-phase-to-ground fault. The only difference is that the phase-to-phase voltage and current must be used.

Similarly, for a close-in fault, when the measured voltage is less than a prespecified level, the healthy phase voltage may be used; for example, $-jV_a$ may replace $V_{bc}$. Note that this substitution is not valid for a close-in three phase fault. If this is a concern, the pre-fault voltage should be used.

For convenience, the four phase comparisons for each phase for multiple phase faults are listed in Table 1. The impedances involved in the comparisons have the same definitions as those in Table 2.

TABLE 2

Multiple Phase Quadrilateral Characteristic

| Phase AB | Phase BC | Phase CA |
|---|---|---|
| $I_{ab} Z_d$ & $V_{ab}$ | $I_{bc} Z_d$ & $V_{bc}$ | $I_{ca} Z_d$ & $V_{ca}$ |
| $V_{ab}$ & $I_{ab} Z_c$ | $V_{bc}$ & $I_{bc} Z_c$ | $V_{ca}$ & $I_{ca} Z_c$ |
| $V_{ab} - I_{ab} Z_c$ & $I_{ab} Z_{cb}$ | $V_{bc} - I_{bc} Z_c$ & $I_{bc} Z_{cb}$ | $V_{ca} - I_{ca} Z_c$ & $I_{ca} Z_{cb}$ |
| $\Delta I_{ab}$ & $V_{ab} - I_{ab} Z_{set}$ | $\Delta I_{bc}$ & $V_{bc} - I_{bc} Z_{set}$ | $\Delta I_{ca}$ & $V_{ca} - I_{ca} Z_{set}$ |

IV. Test Results

The adaptive approaches were tested using a variety of EMTP cases including different lengths of double ended lines, different source impedances and different load conditions. As expected, both the impedance plane and voltage plane methods yield the same unexpectedly good performance. For all single-phase-to-ground fault cases, including forward faults and average faults, with or without fault resistance, the new approaches worked well and demonstrated good directionality.

Each method has some advantages not provided by the other method. For example, the impedance plane method involves some divisions in calculating the impedance and tilt angle. Accordingly, the impedance method is more computation intensive; however, the fault location is provided as a by-product. On the other hand, even though the voltage plane method does not provide the fault location, no divisions are performed. As a result, the voltage plane method is more computationally efficient, resulting in faster response times.

The above description of preferred embodiments is not intended to impliedly limit the scope of protection of the following claims. Thus, for example, except where they are expressly so limited, the following claims are not limited to applications involving three-phase power systems. Moreover, the claims are not limited to fault determination systems associated with any particular section (i.e., feeder, high power transmission line, etc.) of a power distribution system.

I claim:

1. A system for monitoring at least one electric power transmission line for a fault condition within a predetermined distance from a measuring location, comprising:

measuring means coupled to said electric power transmission line at said measuring location for measuring at least one line voltage phasor and at least one line current phasor, said line voltage phasor being indicative of an amplitude and phase associated with a voltage waveform and said line current phasor being indicative of an amplitude and phase associated with a current waveform; and, processing means for defining a quadrilateral trip region in a reference plane, said quadrilateral trip region being formed from at least four reference phasors each having a phase, and wherein the phase of at least one of said at least four reference phasors is periodically adapted based on a negative sequence current;

said processing means being coupled to said measuring means for deriving a line signal having a phase from at least one of said line voltage phasor and said line current phasor and comparing said line signal to the at least four reference phasors such that the fault condition is detected.

2. The system as recited in claim 1 wherein the electric power transmission line is part of a multiple phase electric power transmission system.

3. The system as recited in claim 2, wherein said line signal phase comprises a difference between the phases of each of the faulted phases when said fault condition is a phase-to-phase fault; and, wherein a difference between load current phasors of each of the faulted phases is substituted for negative sequence current in the periodic adaptation of the adapted reference phasor.

4. The system as recited in claim 1 wherein the reference plane comprises a voltage plane.

5. The system as recited in claim 1 wherein the reference plane comprises an impedance plane.

6. The system as recited in claim 4 wherein said fault condition is detected by phase comparisons and without performing mathematical division operations.

7. The system as recited in claim 1 wherein the periodically adapted reference phasor is adapted as function of the phase angle $\alpha$, where $\alpha$ is determined according to the equation:

$$\alpha = arg(I_{relaya}) - arg(I_{a2})$$

where: a comprises the faulted phase;

$I_{a2}$ comprises the negative sequence current of the faulted phase;

$I_{relaya}$ is the relay current in the faulted phase.

8. The system as recited in claim 3 wherein the periodically adapted reference phasor is adapted as a function of the phase angle $\alpha$, where $\alpha$ is determined according to the equation:

$$\alpha = arg(I_{ab}) - arg(I_{ab} - I_{1dab})$$

where: ab indicates the multiple faulted phases;

$I_{ab}$ comprises the phase difference between a first faulted-phase current and a second faulted-phase current; and, $I_{1dab}$ comprises the phase difference between a first faulted-phase load current and a second faulted-phase load current.

9. A system for monitoring at least one electric power transmission line for a fault condition within a predetermined distance from a measuring location, wherein the electric power transmission line is part of a multiple phase electric power transmission system, comprising:

measuring means coupled to said electric power transmission line at said measuring location for measuring at least one line voltage phasor and at least one line current phasor, said line voltage phasor being indicative of an amplitude and phase associated with a voltage waveform and said line current phasor being indicative of an amplitude and phase associated with a current waveform;

means for determining a fault type wherein said fault type is one of a single-phase-to-ground and a phase-to-phase.

processing means for defining a quadrilateral trip region in a voltage plane, said quadrilateral trip region being formed from at least four voltage reference phasors each having a phase, and wherein the phase of at least one of said at least four voltage reference phasors is periodically adapted by an angle $\alpha$, $\alpha$ being determined according to fault type such that for a single-phase-to-ground fault:

$$\alpha = arg(I_{relaya}) - arg(I_{a2})$$

where: a comprises the faulted phase;

$I_{a2}$ comprises the negative sequence current of the faulted phase;

$I_{relaya}$ is the relay current in the faulted phase;

and for a phase-to-phase fault:

$$\alpha = arg(I_{ab}) - arg(I_{ab} - I_{1dab})$$

where: ab indicates the multiple faulted phases;

$I_{ab}$ comprises the phase difference between a first faulted-phase current and a second faulted-phase current; and, $I_{1dab}$ comprises the difference between the first phase load current and the second phase load current;

said processing means being coupled to said measuring means for deriving a line signal having a phase from said line voltage phasor and comparing the phase of said line signal to the phase of each of said at least four voltage reference phasors such that the fault condition is detected without performing mathematical division operations.

10. A process for monitoring at least one electric power transmission line for a fault condition within a predetermined distance from a measuring location, comprising the steps of:

a) measuring at least one line voltage phasor and at least one line current phasor, said line voltage phasor being indicative of an amplitude and phase associated with a voltage waveform and said line current phasor being indicative of an amplitude and phase associated with a current waveform;

b) defining a quadrilateral trip region in a reference plane, said quadrilateral trip region being formed from at least four reference phasors each having a phase;

c) periodically adapting the phase of at least one of said at least four reference phasors based on a negative sequence current;

d) deriving a line signal having a phase from said line voltage phasor and comparing the phase of said line signal to the phase of each of said at least four reference phasors such that the fault condition is detected.

11. The process as recited in claim 10 wherein the electric power transmission lines is part of a multiple phase electric power transmission system.

12. The process as recited in claim 11, wherein said line signal phase comprises a difference between the phases of each of the faulted phases when said fault condition is a phase-to-phase fault; and, wherein a difference between load current phasors of each of the faulted phases is substituted for negative sequence current in the periodic adaptation of the adapted reference phasor.

13. The process as recited in claim 10 wherein the reference plane comprises a voltage plane.

14. The process as recited in claim 10 wherein the reference plane comprises an impedance plane.

15. The process as recited in claim 13 wherein said fault condition is detected without performing mathematical division operations.

16. The process as recited in claim 10 wherein the periodically adapted reference phasor is adapted as function of the phase angle $\alpha$, where $\alpha$ is determined according to the equation:

$$\alpha = arg(I_{relaya}) - arg(I_{a2})$$

where: a comprises the faulted phase;
$I_{a2}$ comprises the negative sequence current of the faulted phase;
$I_{relaya}$ is the relay current in the faulted phase.

17. The process as recited in claim 12 wherein the periodically adapted reference phasor is adapted as a function of the phase angle $\alpha$, where $\alpha$ is determined according to the equation:

$$\alpha = arg(I_{ab}) - arg(I_{ab} - I_{1dab})$$

where: ab denotes the faulted phases;
$I_{1dab}$ comprises the phase difference between the first faulted-phase current and the second faulted-phase current; and,
$I_{1dab}$ comprises the phase difference between the first faulted-phase load current and the second faulted-phase load current.

18. A process for monitoring at least one electric power transmission line for a fault condition within a predetermined distance from a measuring location, wherein the electric power transmission line is part of a multiple phase electric power transmission system, comprising the steps of:

a) measuring at least one line voltage phasor and at least one line current phasor, said line voltage phasor being indicative of an amplitude and phase associated with a voltage waveform and said line current phasor being indicative of an amplitude and phase associated with a current waveform;

b) determining a fault type wherein said fault type is one of a single-phase-to-ground and a phase-to-phase, c) defining a quadrilateral trip region in a voltage plane, said quadrilateral trip region being formed from at least four voltage reference phasors each having a phase, and wherein the phase of at least one of said at least four voltage reference phasors is periodically adapted by an angle $\alpha$, $\alpha$ being determined according to fault type such that for a single-phase-to-ground fault:

$$\alpha = arg(I_{relaya}) - arg(I_{a2})$$

where: a comprises the faulted phase;
$I_{a2}$ comprises the negative sequence current of the faulted phase;
$I_{relaya}$ is the relay current in the faulted phase;
and for a phase-to-phase fault:

$$\alpha = arg(I_{ab}) - arg(I_{ab} - I_{1dab})$$

where: ab indicates the multiple faulted phases;
$I_{ab}$ comprises the phase difference between a first faulted-phase current and a second faulted-phase current; and,
$I_{1dab}$ comprises the difference between the first phase load current and the second phase load current;

deriving a line signal having a phase from said line voltage phasor and comparing the phase of said line signal to the phase of each of said at least four voltage reference phasors such that the fault condition is detected without performing mathematical division operations.

19. A system for monitoring at least one electric power transmission line for a fault condition within a predetermined distance from a measuring location, comprising:

measuring means coupled to said electric power transmission line at said measuring location for measuring at least one line voltage phasor and at least one line current phasor, each line voltage phasor being indicative of an amplitude and phase associated with a voltage waveform and said line current phasor being indicative of an amplitude and phase associated with a current waveform; and, processing means for defining a quadrilateral trip region in an impedance plane, said quadrilateral trip region being formed from at least four impedance reference phasors each having a phase, and wherein the phase of at least one of said at least four impedance reference phasors is periodically adapted by the angle a based on the following equation:

$$\alpha = arg(I_{relaya}) - arg(I_{a2})$$

where: $I_{relaya}$ is the relay current; and
$I_{a2}$ is the negative sequence current;
said processing means being coupled to said measuring means for deriving a measured impedance having a magnitude and phase and detecting a fault condition when said measured impedance is within the quadrilateral trip region.

20. The system as recited in claim 19 wherein the electric power transmission lines define a multiple phase electric power transmission system.

21. A process for monitoring at least one electric power transmission line for a fault condition within a predetermined distance from a measuring location, comprising:

measuring at least one line voltage phasor and at least one line current phasor, each line voltage phasor being indicative of an amplitude and phase associated with a voltage waveform and said line current phasor being indicative of an amplitude and phase associated with a current waveform; and, defining a quadrilateral trip region in an impedance plane, said quadrilateral trip region being formed from at least four impedance reference phasors each having a phase;

periodically adapted at least one of said at least four impedance reference phasors by the angle $\alpha$ based on the following equation:

$$\alpha = arg(I_{relaya}) - arg(I_{a2})$$

where: $I_{relaya}$ is the relay current; and $I_{a2}$ is the negative sequence current;

said processing means being coupled to said measuring means for deriving a measured impedance having a magnitude and phase and detecting a fault condition when said measured impedance is within the quadrilateral trip region.

22. The process as recited in claim 14 wherein the electric power transmission lines define a multiple phase electric power transmission system.

* * * * *

UNITED STATES PATENT AND TRADEMARK OFFICE
CERTIFICATE OF CORRECTION

PATENT NO. : 5,796,258
DATED : August 18, 1998
INVENTOR(S) : Lifeng Yang

It is certified that error appears in the above-indentified patent and that said Letters Patent is hereby corrected as shown below:

Col. 12, (claim 19), line 38, "angle a" should read --angle α--

Signed and Sealed this

Twenty-fourth Day of November, 1998

Attest:

BRUCE LEHMAN

Attesting Officer

Commissioner of Patents and Trademarks